United States Patent [19]

Triolo et al.

[11] Patent Number: 5,034,422

[45] Date of Patent: Jul. 23, 1991

[54] LOW DENSITY, HIGH TEMPERATURE RESISTANT POLYMERIC BODIES

[75] Inventors: Rocco P. Triolo, Broomall; Sharon A. Free, Wallingford; David J. Kelly, Chadds Ford, all of Pa.

[73] Assignee: Foamex LP, Eddystone, Pa.

[21] Appl. No.: 630,306

[22] Filed: Dec. 19, 1990

[51] Int. Cl.$^5$ ............................. C08J 9/26; C08J 9/38
[52] U.S. Cl. ................................. 521/52; 264/46.5; 521/53; 521/54; 521/61; 521/145; 521/154; 521/184; 521/134
[58] Field of Search ................... 264/46.5; 521/52, 61, 521/53, 54, 184, 145, 134

[56] References Cited

U.S. PATENT DOCUMENTS

| | | | |
|---|---|---|---|
| 3,007,896 | 11/1961 | Clasen | 521/61 |
| 3,753,756 | 8/1983 | Lox | 521/52 |
| 4,171,410 | 10/1979 | Fröb | 521/52 |
| 4,237,239 | 12/1980 | Lilley | 521/52 |
| 4,259,452 | 3/1981 | Yukuta et al. | 521/52 |
| 4,933,372 | 6/1990 | Feibush et al. | 521/61 |

*Primary Examiner*—Morton Foelak
*Attorney, Agent, or Firm*—Connolly and Hutz

[57] ABSTRACT

A low density, open cell polymeric body is formed by coating or filling a reticulated polymeric foam with a liquid-form polymer which is resistant to high temperatures, curing the liquid form polymer in and on the foam and then removing the foam skeleton by dissolving and leaching the foam out of the solid polymeric body which remains.

2 Claims, No Drawings

LOW DENSITY, HIGH TEMPERATURE RESISTANT POLYMERIC BODIES

The present invention is directed to an open-celled, low density article made up of a high temperature resistant polymer.

BACKGROUND OF THE INVENTION

It has long been known that a "foam" of polyurethane can be prepared by reacting a polyisocyanate with a poly-hydroxy compound in the presence of a small amount of water which acts as a blowing agent. The water reacts with isocyanate groups producing carbon dioxide gas which forms small gas bubbles or cells in the "foam" when the polyurethane sets.

Such "foam" products have a structure made up of numerous individual cells which generally are constructed of a three dimensional skeletal structure of interconnected strands with membranes or windows joined to the skeletal structure such that they partition contiguous cells. The skeletal structure in these cellular materials is usually considerably thicker than the membranes or windows.

When the foam windows are removed, an open-celled reticulated foam is produced which permits fluids to flow through the remaining skeletal structure. A method for producing reticulated foam is described in U.S. Pat. No. 3,175,025 to Geen.

Porous ceramic bodies have been formed by coating polyurethane with a ceramic material of choice and then removing the polyurethane by dissolving, depolymerizing, hydrolyzing and so forth. See U.S. Pat. Nos. 3,833,386 and 3,845,181.

Ceramic filters have also been manufactured by coating a polyurethane foam of a selected configuration with a ceramic material and then burning the polyurethane out of the resulting ceramic body. See U.S. Pat. Nos. 3,090,094 and 4,396,565.

Methods of hydrolyzing polyurethane foam are described in U.S. Pat. Nos. 4,196,148 and 4,328,368.

BRIEF DESCRIPTION OF THE INVENTION

Reticulated polyurethane foam has found many uses in industry. However, uses are limited by virtue of the chemical and physical properties of polyurethane itself. For example, polyurethane is easily broken down by the action of harsh chemical reagents and by extremes of temperature. It is an object of the present invention to provide an open celled, low density polymeric foam which is resistant to high temperatures and chemical degradation. This object is achieved by providing a polymeric foam wherein the polymer is a non-urethane and comprises a fluoroelastomer, acrylic-silane polymer, fluorosilicone polymer or polybenzimidazole.

DETAILED DESCRIPTION

It has been discovered that a low density foam of polymers heretofore not known can be obtained with a reticulated, open-celled structure having intercommunicating cells and with a controllable foam cell size. The product of the present invention is obtained by choosing a reticulated polyurethane foam to serve as the skeleton or mold for the high temperature resistant polymer (HTP).

In the present context high temperature resistant polymer means organic or silicone polymer which will withstand a temperature of 300° F. or higher on a continuing basis without significant thermal degradation. Polymers such as polyolefins and polyacrylic fail to meet this criterion.

The polyurethane skeleton or mold can be a polyether polyurethane or a polyester polyurethane. In either, the physical structure must be reticulated (open-celled, intercommunicating structure) with a density of 0.8 to 6 pounds per cubic foot and a pore size of 3 to 100 pores per linear inch. Because the polyurethane forms the skeleton or mold for the product of this invention, the pore size of the product will correspond directly to the pore size of the polyurethane and the density of the product will be proportional depending on the density and quantity of the particular HTP.

The polyurethane foam mold is coated with a fluid form of HTP. After the HTP is hardened on the polyurethane foam mold, the polyurethane is removed by a convenient means, such as by acid hydrolysis for polyester polyurethane or by pyrolysis for polyether polyurethane leaving the HTP foam product.

The resulting reticulated low density foam structure of HTP is useful in any application where a reticulated polyurethane foam would be useful and, in addition, is useful in environments of high temperature where polyurethane would break down. In particular, the product of this invention is useful as a filter for use in high temperature environments, such as heating device filters, as a suppressor of noise at high temperatures and for slosh mitigation in high temperature liquid tanks.

A product density of 6 pounds per cubic foot or less (i.e., 1 to 6 pounds per cubic foot) is obtained in the reticulated HTP foam of this invention. A density of about 1 to 3 pounds per cubic foot is preferred. The product density can be selected and regulated by adjusting two factors. The density of the HTP is one factor. At equal coating thickness, a lower density HTP will yield a lower product density. The second factor is the amount of HTP applied to the polyurethane skeleton. A minimal coating of the polyurethane skeleton would result in a different product density than if the polyurethane foam were completely filled with HTP. Complete filling is to be avoided because it would result in a non-reticulated, closed cell product. The product of this invention must be self-supporting, and below 1 pound per cubic foot density the product would not be self supporting. Above 6 pounds per cubic foot density removal of polyurethane becomes difficult and reticulation is decreased or lost.

The HTP can be applied to the polyurethane in any convenient fluid form. A preferred method of applying HTP is by a solvent solution of HTP. The HTP is dissolved in a suitable solvent which does not attack, dissolve or react with the polyurethane substrate. Solvents are selected to be compatible with the HTP used and include ketones (such as isobutyl ketone or methyl ethyl ketone), esters (such as ethyl acetate), propylene carbonate or water. The HTP solution is applied to the polyurethane foam skeleton mold by a suitable method such as soaking the foam in the solution. Excess solution can be removed from the foam by draining or squeezing the foam. Then solvent is removed by evaporation, leaving the HTP coated on the strands of polyurethane which form the skeleton structure.

Thickness of the HTP coating can be regulated by using a plurality of successive coatings or by adjusting the viscosity of the solution applied or by adjusting nip pressure when removing excess coating solution. A plurality of coatings can be applied until the desired HTP density is achieved. Also, by increasing solution viscosity a thicker HTP coating can be achieved in a single application of solution to the foam skeleton.

In addition to use of thickening agents in the HTP solution, additional filler additives can be added to the solution to stiffen the HTP when deposited on the polyurethane skeleton. Examples of such additives are silica, polytrichlorofluorethylene, carbon black, glass fibers, talc and so forth.

Any polymer which is resistant to high temperatures and which is subject to fluidization is suitable as the HTP of this invention. In particular, preferred HTP materials are fluoroelastomers, acrylic-silanes, fluorosilicone polymers and polybenzimidazoles. The fluoroelastomers useful as the HTP include a class of polymers composed of various ratios of vinylidene fluoride, hexafluoropropylene, and tetrafluoroethylene. They can be completely fluorinated if composed only of hexafluoropropylene and tetrafluoroethylene. Usually vinylidene fluoride is present to give elastomeric properties to the polymer. Molecular weight of the fluoroelastomer ranges from 40,000 g/mole to 140,000 g/mole. Examples of these copolymers which are stable to 460° F. are sold by 3M Corporation under the name FC2178 and by DuPont under the name Viton AHV.

The preferred fluoroelastomer for the HTP is a copolymer of vinylidene fluoride and hexafluoropropylene. The vinylidene fluoride contributes flexibility and a polymer content of about 66% fluorine content gives chemical resistance. A high molecular weight (up to 140,000 g/mole) is needed for the fluoroelastomer foam to be self-supporting.

Acrylic-silane polymers useful as the HTP are random block polymers formed from acrylic polymer and silicone polymer. The silicone content ranges from 1 to 42%. The preferred acrylic-silanes have a silicone content of 32 to 42%. The acrylic-silanes are supplied as latices. Acrylic-silane polymers stable to 550° F. are sold by Multipolymer Corporation under the name A150S and X-15.

Fluorosilicones are high temperature resistant sealants designed for use by the aerospace, aircraft, and automotive industries. They have a working temperature range of −70 to 500° F. The fluorosilicones can be moisture cured or peroxide cured. The preferred fluorosilicone is moisture cured. The molecular weight is about 200,000 to 300,000 g/mole and fluorosilicones useful as HTP include the fluorosilicone polymer Q4-2814 sold by Dow-Corning Corporation.

The following examples serve to further illustrate the present invention.

EXAMPLE 1

A ½" thick sheet of a reticulated, 15 pores per inch, 1.3 lbs./ft.$^3$ polyester polyurethane foam was dipped into a solution of the following composition:
fluoroelastomer 15.2
medium thermal black 3.0
magnesium oxide 1.8
triethylenetetramine 0.2
methyl ethyl ketone 68.0
propylene carbonate 12.0

The wet foam was then nipped between a set of rollers to remove the excess material. After the solvent evaporated, the coated foam had a density of 3.0 lbs./ft.$^3$. The dry coated foam was cured at 350° F. for ½ hour and post-cured at 450° F. for 24 hours. After curing, the sample was immersed in concentrated hydrochloric acid for 24 hours. The acid hydrolyzed the polyester polyurethane foam substrate to yield a skeletal structure composed entirely of the fluoroelastomer and fillers.

This three dimensional fluoroelastomer skeleton had the same reticulated, 15 pores per inch structure as the urethane mold. Its density was 1.7 lbs./ft.$^3$.

EXAMPLE 2

Example 1 was repeated with more solution coated onto the foam and the final product density after polyurethane removal was 3 lbs./ft.$^3$.

EXAMPLE 3

Example 1 was repeated with a polyester polyurethane foam substrate having 25 pores per linear inch. Its final density was 1.7 lbs./ft.$^3$.

EXAMPLE 4

Example 1 was repeated with one-fourth of the thermal black replaced with a conductive carbon black. The electrical resistivity of the product fluoroelastomer structure was $2 \times 10^8$ ohm-cm.

EXAMPLE 5

A fluoroelastomer skeleton was produced as in Example 1. The reticulated, 15 pores per inch, 1.3 lbs./ft.$^3$ fluoroelastomer foam was dipped into an acrylic-silane latex and nipped between rollers. The dried product was a 3.0 lbs./ft.$^3$, reticulated foam composed of a fluoroelastomer and an acrylic-silane.

EXAMPLE 6

The same method described in Example 5 was used to produce a conductive fluoroelastomer/acrylic-silane foam. A fluoroelastomer skeleton was prepared as in Example 4 and overcoated with the acrylic-silane. The electrical resistivity of the final product was $2 \times 10^8$ ohm-cm.

EXAMPLE 7

A ½" sheet of reticulated, 15 pores per inch, 1.3 lbs./ft.$^3$ polyester polyurethane foam was dipped into an acrylic-silane aqueous latex. After evaporating the water, the coated foam was immersed in a hydrochloric acid bath to remove the ester foam. This treatment yielded a reticulated 1.5 lbs./ft.$^3$ acrylic-silane foam.

EXAMPLE 8

An acrylic-silane foam produced by the method described in Example 7 was coated with the fluoroelastomer to yield a 3.0 lbs./ft.$^3$ foam with an acrylic-silane core and a fluoroelastomer overcoat, essentially the reverse of the product described in Example 5.

EXAMPLE 9

A moisture curable fluorosilicone, Q4-2814 from Dow-Corning, was dissolved in a methylethylketone/propylene carbonate solution (85/15 by weight). The solids content of the solution was 15%. A ½" thick piece of reticulated, 15 pores per inch, 1.3 lbs./ft.$^3$ polyester polyurethane foam was dipped into this solution and nipped between rollers to remove the excess material. The sample was cured for 24 hours in a 75° F., 50% relative humidity environment. The cured coated foam was immersed in 140° F. hydrochloric acid for one hour to remove the ester foam. The resultant product was a three dimensional, reticulated, 1.7 lbs./ft.$^3$ fluorosilicone foam.

EXAMPLE 10

A sample of poly 2,2'(n-phenylene)-5,5' dibenzimidazole was obtained as a 25% solution in N,N-dimethylacetamide. This was diluted with dimethylsulfoxide. A reticulated polyester foam was dipped into this solution. After drying, the coated foam was immersed in hydrochloric acid until the ester foam was completely removed. The final product was a reticulated polybenzimidazole foam with a density of 1.0 lb./ft.$^3$.

What is claimed is:

1. A porous, self-supporting polymer article which comprises a structure with a plurality of open-cells, a density of 1 to 6 pounds per cubic foot, 3 to 100 pores per linear inch and capable of withstanding a sustained temperature of at least 300° F. without significant thermal degradation, wherein the polymer is a fluoroelastomer, acrylic-silane polymer, fluorosilicone polymer, polybenzimidazole, or a combination of these polymers.

2. A porous, self-supporting polymeric body which comprises a fluoroelastomer, acrylic-silane polymer, fluorosilicone polymer, polybenzimidazole, or a combination of these polymers having a density of 1 to 6 pounds per cubic foot, 3 to 100 pores per linear inch and capable of withstanding a sustained temperature of at least 300° F. without significant thermal degradation, which is the product of the process which comprises coating a hydrolyzable or pyrolyzable reticulated polymeric foam substrate with a solution of a heat resistant polymer, removing solvent from the solution coated onto the foam substrate and then removing the foam susbtrate by hydrolysis or pyrolysis, wherein the heat resistant polymer is a fluoroelastomer, acrylic-silane polymer, fluorosilicone polymer or polybenzimidazole or a combination of these polymers.

* * * * *